United States Patent
Knight et al.

(10) Patent No.: US 8,700,627 B2
(45) Date of Patent: Apr. 15, 2014

(54) SYSTEM AND METHOD FOR DISPLAYING RELATIONSHIPS BETWEEN CONCEPTS TO PROVIDE CLASSIFICATION SUGGESTIONS VIA INCLUSION

(75) Inventors: William C. Knight, Bainbridge Island, WA (US); Nicholas I. Nussbaum, Seattle, WA (US); John W. Conwell, Tukwila, WA (US)

(73) Assignee: FTI Consulting, Inc., Annapolis, MD (US)

(*) Notice: Subject to any disclaimer, the term of this patent is extended or adjusted under 35 U.S.C. 154(b) by 76 days.

(21) Appl. No.: 12/844,810

(22) Filed: Jul. 27, 2010

(65) Prior Publication Data
US 2011/0029531 A1    Feb. 3, 2011

Related U.S. Application Data

(60) Provisional application No. 61/229,216, filed on Jul. 28, 2009, provisional application No. 61/236,490, filed on Aug. 24, 2009.

(51) Int. Cl.
*G06F 17/30* (2006.01)
*G06F 7/00* (2006.01)

(52) U.S. Cl.
CPC ...... *G06F 17/30713* (2013.01); *G06F 17/3071* (2013.01)
USPC .......................................... 707/737; 707/748

(58) Field of Classification Search
CPC ............... G06F 17/30713; G06F 17/3071
USPC .................................. 707/737, 748
See application file for complete search history.

(56) References Cited

U.S. PATENT DOCUMENTS

| | | |
|---|---|---|
| 3,416,150 A | 12/1968 | Lindberg |
| 3,426,210 A | 2/1969 | Agin |
| 3,668,658 A | 6/1972 | Flores et al. |
| 4,893,253 A | 1/1990 | Lodder |

(Continued)

FOREIGN PATENT DOCUMENTS

| | | |
|---|---|---|
| EP | 1024437 | 8/2000 |
| EP | 1049030 | 11/2000 |

(Continued)

OTHER PUBLICATIONS

Slaney et al., "Multimedia Edges: Finding Hierarchy in all Dimensions" PROC. 9-th ACM Intl. Conf. on Multimedia, pp. 29-40, ISBN. 1-58113-394-4, Sep. 30, 2001, XP002295016 Ottawa (Sep. 30, 2001).

(Continued)

*Primary Examiner* — Ann Chempakaseril
(74) *Attorney, Agent, or Firm* — Patrick J. S. Inouye; Krista A. Wittman; Leonid Kisselev

(57) ABSTRACT

A system and for displaying relationships between concepts to provide classification suggestions via inclusion is provided. A set of reference concepts each associated with a classification code is designated. One or more of the reference concepts are combined with a set of uncoded concepts. Clusters of the uncoded concepts and the one or more reference concepts are generated. Relationships between the uncoded concepts and the one or more reference concepts in at least one cluster are visually depicted as suggestions for classifying the uncoded concepts in that cluster.

20 Claims, 10 Drawing Sheets

(56) References Cited

U.S. PATENT DOCUMENTS

| | | |
|---|---|---|
| 5,056,021 A | 10/1991 | Ausborn |
| 5,121,338 A | 6/1992 | Lodder |
| 5,133,067 A | 7/1992 | Hara et al. |
| 5,278,980 A | 1/1994 | Pedersen et al. |
| 5,371,673 A | 12/1994 | Fan |
| 5,442,778 A | 8/1995 | Pedersen et al. |
| 5,477,451 A | 12/1995 | Brown et al. |
| 5,488,725 A | 1/1996 | Turtle et al. |
| 5,524,177 A | 6/1996 | Suzuoka |
| 5,528,735 A | 6/1996 | Strasnick et al. |
| 5,619,632 A | 4/1997 | Lamping et al. |
| 5,619,709 A | 4/1997 | Caid et al. |
| 5,635,929 A | 6/1997 | Rabowsky et al. |
| 5,649,193 A | 7/1997 | Sumita et al. |
| 5,675,819 A | 10/1997 | Schuetze |
| 5,696,962 A | 12/1997 | Kupiec |
| 5,737,734 A | 4/1998 | Schultz |
| 5,754,938 A | 5/1998 | Herz et al. |
| 5,794,236 A | 8/1998 | Mehrle |
| 5,799,276 A | 8/1998 | Komissarchik et al. |
| 5,819,258 A | 10/1998 | Vaithyanathan et al. |
| 5,842,203 A | 11/1998 | D'Elena et al. |
| 5,844,991 A | 12/1998 | Hochberg et al. |
| 5,857,179 A | 1/1999 | Vaithyanathan et al. |
| 5,860,136 A | 1/1999 | Fenner |
| 5,862,325 A | 1/1999 | Reed et al. |
| 5,864,846 A | 1/1999 | Voorhees et al. |
| 5,864,871 A | 1/1999 | Kitain et al. |
| 5,867,799 A | 2/1999 | Lang et al. |
| 5,870,740 A | 2/1999 | Rose et al. |
| 5,909,677 A | 6/1999 | Broder et al. |
| 5,915,024 A | 6/1999 | Kitaori et al. |
| 5,920,854 A | 7/1999 | Kirsch et al. |
| 5,924,105 A | 7/1999 | Punch et al. |
| 5,940,821 A | 8/1999 | Wical |
| 5,950,146 A | 9/1999 | Vapnik |
| 5,950,189 A | 9/1999 | Cohen et al. |
| 5,966,126 A | 10/1999 | Szabo |
| 5,987,446 A | 11/1999 | Corey et al. |
| 6,006,221 A | 12/1999 | Liddy et al. |
| 6,012,053 A | 1/2000 | Pant et al. |
| 6,026,397 A | 2/2000 | Sheppard |
| 6,038,574 A | 3/2000 | Pitkow et al. |
| 6,070,133 A | 5/2000 | Brewster et al. |
| 6,089,742 A | 7/2000 | Warmerdam et al. |
| 6,092,059 A | 7/2000 | Straforini et al. |
| 6,094,649 A | 7/2000 | Bowen et al. |
| 6,100,901 A | 8/2000 | Mohda et al. |
| 6,119,124 A | 9/2000 | Broder et al. |
| 6,122,628 A | 9/2000 | Castelli et al. |
| 6,137,499 A | 10/2000 | Tesler |
| 6,137,545 A | 10/2000 | Patel et al. |
| 6,137,911 A | 10/2000 | Zhilyaev |
| 6,148,102 A | 11/2000 | Stolin |
| 6,154,219 A | 11/2000 | Wiley et al. |
| 6,167,368 A | 12/2000 | Wacholder |
| 6,173,275 B1 | 1/2001 | Caid et al. |
| 6,202,064 B1 | 3/2001 | Julliard |
| 6,216,123 B1 | 4/2001 | Robertson et al. |
| 6,243,713 B1 | 6/2001 | Nelson et al. |
| 6,243,724 B1 | 6/2001 | Mander et al. |
| 6,260,038 B1 | 7/2001 | Martin et al. |
| 6,326,962 B1 | 12/2001 | Szabo |
| 6,338,062 B1 | 1/2002 | Liu |
| 6,345,243 B1 | 2/2002 | Clark |
| 6,349,296 B1 | 2/2002 | Broder et al. |
| 6,349,307 B1 | 2/2002 | Chen |
| 6,360,227 B1 | 3/2002 | Aggarwal et al. |
| 6,363,374 B1 | 3/2002 | Corston-Oliver et al. |
| 6,377,287 B1 | 4/2002 | Hao et al. |
| 6,381,601 B1 | 4/2002 | Fujiwara et al. |
| 6,389,433 B1 | 5/2002 | Bolosky et al. |
| 6,389,436 B1 | 5/2002 | Chakrabarti et al. |
| 6,408,294 B1 | 6/2002 | Getchius et al. |
| 6,414,677 B1 | 7/2002 | Robertson et al. |
| 6,415,283 B1 | 7/2002 | Conklin |
| 6,418,431 B1 | 7/2002 | Mahajan et al. |
| 6,421,709 B1 | 7/2002 | McCormick et al. |
| 6,438,537 B1 | 8/2002 | Netz et al. |
| 6,438,564 B1 | 8/2002 | Morton et al. |
| 6,442,592 B1 | 8/2002 | Alumbaugh et al. |
| 6,446,061 B1 | 9/2002 | Doerre et al. |
| 6,449,612 B1 | 9/2002 | Bradley et al. |
| 6,453,327 B1 | 9/2002 | Nielsen |
| 6,460,034 B1 | 10/2002 | Wical |
| 6,470,307 B1 | 10/2002 | Turney |
| 6,480,843 B2 | 11/2002 | Li |
| 6,480,885 B1 | 11/2002 | Olivier |
| 6,484,168 B1 | 11/2002 | Pennock et al. |
| 6,484,196 B1 | 11/2002 | Maurille |
| 6,493,703 B1 | 12/2002 | Knight et al. |
| 6,496,822 B2 | 12/2002 | Rosenfelt et al. |
| 6,502,081 B1 | 12/2002 | Wiltshire, Jr. et al. |
| 6,507,847 B1 | 1/2003 | Fleischman |
| 6,510,406 B1 | 1/2003 | Marchisio |
| 6,519,580 B1 | 2/2003 | Johnson et al. |
| 6,523,026 B1 | 2/2003 | Gillis |
| 6,523,063 B1 | 2/2003 | Miller et al. |
| 6,542,889 B1 | 4/2003 | Aggarwal et al. |
| 6,544,123 B1 | 4/2003 | Tanaka et al. |
| 6,549,957 B1 | 4/2003 | Hanson et al. |
| 6,560,597 B1 | 5/2003 | Dhillon et al. |
| 6,571,225 B1 | 5/2003 | Oles et al. |
| 6,584,564 B2 | 6/2003 | Olkin et al. |
| 6,594,658 B2 | 7/2003 | Woods |
| 6,598,054 B2 | 7/2003 | Schuetze et al. |
| 6,606,625 B1 | 8/2003 | Muslea et al. |
| 6,611,825 B1 | 8/2003 | Billheimer et al. |
| 6,628,304 B2 | 9/2003 | Mitchell et al. |
| 6,629,097 B1 | 9/2003 | Keith |
| 6,640,009 B2 | 10/2003 | Zlotnick |
| 6,651,057 B1 | 11/2003 | Jin et al. |
| 6,654,739 B1 | 11/2003 | Apte et al. |
| 6,658,423 B1 | 12/2003 | Pugh et al. |
| 6,675,159 B1 | 1/2004 | Lin et al. |
| 6,675,164 B2 | 1/2004 | Kamath et al. |
| 6,678,705 B1 | 1/2004 | Berchtold et al. |
| 6,684,205 B1 | 1/2004 | Modha et al. |
| 6,697,998 B1 | 2/2004 | Damerau et al. |
| 6,701,305 B1 | 3/2004 | Holt et al. |
| 6,711,585 B1 | 3/2004 | Copperman et al. |
| 6,714,929 B1 | 3/2004 | Micaelian et al. |
| 6,735,578 B2 | 5/2004 | Shetty et al. |
| 6,738,759 B1 | 5/2004 | Wheeler et al. |
| 6,747,646 B2 | 6/2004 | Gueziec et al. |
| 6,751,628 B2 | 6/2004 | Coady |
| 6,757,646 B2 | 6/2004 | Marchisio |
| 6,785,679 B1 | 8/2004 | Dane et al. |
| 6,804,665 B2 | 10/2004 | Kreulen et al. |
| 6,816,175 B1 | 11/2004 | Hamp et al. |
| 6,819,344 B2 | 11/2004 | Robbins |
| 6,823,333 B2 | 11/2004 | McGreevy |
| 6,841,321 B2 | 1/2005 | Matsumoto et al. |
| 6,847,966 B1 | 1/2005 | Sommer et al. |
| 6,862,710 B1 | 3/2005 | Marchisio |
| 6,879,332 B2 | 4/2005 | Decombe |
| 6,883,001 B2 | 4/2005 | Abe |
| 6,886,010 B2 | 4/2005 | Kostoff |
| 6,888,584 B2 | 5/2005 | Suzuki et al. |
| 6,915,308 B1 | 7/2005 | Evans et al. |
| 6,922,699 B2 | 7/2005 | Schuetze et al. |
| 6,941,325 B1 | 9/2005 | Benitez et al. |
| 6,970,881 B1 | 11/2005 | Mohan et al. |
| 6,978,419 B1 | 12/2005 | Kantrowitz |
| 6,990,238 B1 | 1/2006 | Saffer et al. |
| 6,993,535 B2 | 1/2006 | Bolle et al. |
| 6,996,575 B2 | 2/2006 | Cox et al. |
| 7,003,551 B2 | 2/2006 | Malik |
| 7,146,361 B2 | 2/2006 | Broder et al. |
| 7,013,435 B2 | 3/2006 | Gallo et al. |
| 7,020,645 B2 | 3/2006 | Bisbee et al. |
| 7,039,856 B2 | 5/2006 | Peairs et al. |
| 7,051,017 B2 | 5/2006 | Marchisio |
| 7,054,870 B2 | 5/2006 | Holbrook |

(56) References Cited

U.S. PATENT DOCUMENTS

| | | |
|---|---|---|
| 7,080,320 B2 | 7/2006 | Ono |
| 7,096,431 B2 | 8/2006 | Tambata et al. |
| 7,099,819 B2 | 8/2006 | Sakai et al. |
| 7,107,266 B1 | 9/2006 | Breyman et al. |
| 7,117,151 B2 | 10/2006 | Iwahashi et al. |
| 7,117,246 B2 | 10/2006 | Christenson et al. |
| 7,130,807 B1 | 10/2006 | Mikurak |
| 7,137,075 B2 | 11/2006 | Hoshino et al. |
| 7,139,739 B2 | 11/2006 | Agrafiotis et al. |
| 7,155,668 B2 | 12/2006 | Holland et al. |
| 7,188,107 B2 | 3/2007 | Moon et al. |
| 7,188,117 B2 | 3/2007 | Farahat et al. |
| 7,194,458 B1 | 3/2007 | Micaelian et al. |
| 7,194,483 B1 | 3/2007 | Mohan et al. |
| 7,197,497 B2 | 3/2007 | Cossock |
| 7,209,949 B2 | 4/2007 | Mousseau et al. |
| 7,233,886 B2 | 6/2007 | Wegerich et al. |
| 7,233,940 B2 | 6/2007 | Bamberger et al. |
| 7,239,986 B2 | 7/2007 | Golub et al. |
| 7,240,199 B2 | 7/2007 | Tomkow |
| 7,246,113 B2 | 7/2007 | Cheetham et al. |
| 7,251,637 B1 | 7/2007 | Caid et al. |
| 7,266,365 B2 | 9/2007 | Ferguson et al. |
| 7,266,545 B2 | 9/2007 | Bergman et al. |
| 7,269,598 B2 | 9/2007 | Marchisio |
| 7,271,801 B2 | 9/2007 | Toyozawa et al. |
| 7,277,919 B1 | 10/2007 | Donoho et al. |
| 7,325,127 B2 | 1/2008 | Olkin et al. |
| 7,353,204 B2 | 4/2008 | Liu |
| 7,359,894 B1 | 4/2008 | Liebman et al. |
| 7,363,243 B2 | 4/2008 | Arnett et al. |
| 7,366,759 B2 | 4/2008 | Trevithick et al. |
| 7,373,612 B2 | 5/2008 | Risch et al. |
| 7,376,635 B1 | 5/2008 | Porcari et al. |
| 7,379,913 B2 | 5/2008 | Steele et al. |
| 7,383,282 B2 | 6/2008 | Whitehead et al. |
| 7,401,087 B2 | 7/2008 | Copperman et al. |
| 7,412,462 B2 | 8/2008 | Margolus et al. |
| 7,418,397 B2 | 8/2008 | Kojima et al. |
| 7,430,717 B1 | 9/2008 | Spangler |
| 7,433,893 B2 | 10/2008 | Lowry |
| 7,440,662 B2 | 10/2008 | Antona et al. |
| 7,444,356 B2 | 10/2008 | Calistri-Yeh et al. |
| 7,457,948 B1 | 11/2008 | Bilicksa et al. |
| 7,472,110 B2 | 12/2008 | Achlioptas |
| 7,490,092 B2 | 2/2009 | Morton et al. |
| 7,509,256 B2 | 3/2009 | Iwahashi et al. |
| 7,516,419 B2 | 4/2009 | Petro et al. |
| 7,523,349 B2 | 4/2009 | Barras |
| 7,558,769 B2 | 7/2009 | Scott et al. |
| 7,571,177 B2 | 8/2009 | Damle |
| 7,574,409 B2 | 8/2009 | Patinkin |
| 7,584,221 B2 | 9/2009 | Robertson et al. |
| 7,639,868 B1 | 12/2009 | Regli et al. |
| 7,640,219 B2 | 12/2009 | Perrizo |
| 7,647,345 B2 | 1/2010 | Trepess et al. |
| 7,668,376 B2 | 2/2010 | Lin et al. |
| 7,698,167 B2 | 4/2010 | Batham et al. |
| 7,716,223 B2 | 5/2010 | Haveliwala et al. |
| 7,743,059 B2 | 6/2010 | Chan et al. |
| 7,761,447 B2 | 7/2010 | Brill et al. |
| 7,801,841 B2 | 9/2010 | Mishra et al. |
| 7,885,901 B2 | 2/2011 | Hull et al. |
| 7,971,150 B2 | 6/2011 | Raskutti et al. |
| 8,010,466 B2 | 8/2011 | Patinkin |
| 8,010,534 B2 | 8/2011 | Roitblat et al. |
| 8,165,974 B2 | 4/2012 | Privault et al. |
| 2002/0032735 A1 | 3/2002 | Burnstein et al. |
| 2002/0065912 A1 | 5/2002 | Catchpole et al. |
| 2002/0078044 A1 | 6/2002 | Song et al. |
| 2002/0078090 A1 | 6/2002 | Hwang et al. |
| 2002/0122543 A1 | 9/2002 | Rowen |
| 2002/0184193 A1 | 12/2002 | Cohen |
| 2003/0046311 A1 | 3/2003 | Baidya et al. |
| 2003/0130991 A1 | 7/2003 | Reijerse et al. |
| 2003/0172048 A1 | 9/2003 | Kauffman |
| 2003/0174179 A1 | 9/2003 | Suermondt et al. |
| 2004/0024739 A1* | 2/2004 | Copperman et al. ............... 707/1 |
| 2004/0024755 A1 | 2/2004 | Rickard |
| 2004/0034633 A1 | 2/2004 | Rickard |
| 2004/0205482 A1 | 10/2004 | Basu et al. |
| 2004/0205578 A1 | 10/2004 | Wolff et al. |
| 2004/0215608 A1 | 10/2004 | Gourlay |
| 2004/0243556 A1 | 12/2004 | Ferrucci et al. |
| 2005/0025357 A1 | 2/2005 | Landwehr et al. |
| 2005/0097435 A1 | 5/2005 | Prakash et al. |
| 2005/0171772 A1 | 8/2005 | Iwahashi et al. |
| 2005/0203924 A1 | 9/2005 | Rosenberg |
| 2005/0283473 A1 | 12/2005 | Rousso et al. |
| 2006/0008151 A1 | 1/2006 | Lin et al. |
| 2006/0021009 A1 | 1/2006 | Lunt |
| 2006/0053382 A1 | 3/2006 | Gardner et al. |
| 2006/0122974 A1 | 6/2006 | Perisic |
| 2006/0122997 A1 | 6/2006 | Lin |
| 2007/0020642 A1 | 1/2007 | Deng et al. |
| 2007/0043774 A1 | 2/2007 | Davis et al. |
| 2007/0044032 A1 | 2/2007 | Mollitor et al. |
| 2007/0112758 A1 | 5/2007 | Livaditis |
| 2007/0150801 A1 | 6/2007 | Chidlovskii et al. |
| 2007/0214133 A1 | 9/2007 | Liberty et al. |
| 2007/0288445 A1 | 12/2007 | Kraftsow |
| 2008/0005081 A1 | 1/2008 | Green et al. |
| 2008/0140643 A1 | 6/2008 | Ismalon |
| 2008/0183855 A1 | 7/2008 | Agarwal et al. |
| 2008/0189273 A1 | 8/2008 | Kraftsow et al. |
| 2008/0215427 A1 | 9/2008 | Kawada et al. |
| 2008/0228675 A1 | 9/2008 | Duffy et al. |
| 2009/0041329 A1 | 2/2009 | Nordell et al. |
| 2009/0043797 A1 | 2/2009 | Dorie et al. |
| 2009/0049017 A1 | 2/2009 | Gross |
| 2009/0097733 A1 | 4/2009 | Hero et al. |
| 2009/0106239 A1 | 4/2009 | Getner et al. |
| 2009/0222444 A1 | 9/2009 | Chowdhury et al. |
| 2009/0228499 A1 | 9/2009 | Schmidtler et al. |
| 2009/0228811 A1 | 9/2009 | Adams et al. |
| 2010/0100539 A1 | 4/2010 | Davis et al. |
| 2010/0198802 A1 | 8/2010 | Kraftsow |
| 2010/0250477 A1 | 9/2010 | Yadav |
| 2010/0262571 A1 | 10/2010 | Schmidtler et al. |
| 2010/0268661 A1 | 10/2010 | Levy et al. |
| 2012/0124034 A1 | 5/2012 | Jing et al. |

FOREIGN PATENT DOCUMENTS

| | | |
|---|---|---|
| EP | 0886227 | 10/2003 |
| WO | WO 0067162 | 11/2000 |
| WO | 03052627 | 6/2003 |
| WO | 03060766 | 7/2003 |
| WO | WO 2005073881 | 8/2005 |
| WO | 06008733 | 1/2006 |

OTHER PUBLICATIONS

Strehl et al., "Cluster Ensembles—A Knowledge Reuse Framework for Combining Partitioning," Journal of Machine Learning Research, MIT Press, Cambridge, MA, US, ISSN: 1533-7928, vol. 3, No. 12, pp. 583-617, XP002390603 (Dec. 2002).

V. Faber, "Clustering and the Continuous K-Means Algorithm," Los Alamos Science, The Laboratory, Los Alamos, NM, US, No. 22, Jan. 1, 1994, pp. 138-144.

Wang et al., "Learning text classifier using the domain concept hierarchy," Communications, Circuits and Systems and West Sino Expositions, IEEE 2002 International Conference on Jun. 29-Jul. 1, 2002, Piscataway, NJ, USA, IEEE, vol. 2, pp. 1230-1234 (2002).

Whiting et al., "Image Quantization: Statistics and Modeling," SPIE Conference of Physics of Medical Imaging, San Diego, CA, USA, vol. 3336, pp. 260-271 (Feb. 1998).

Bernard et al.: "Labeled Radial Drawing of Data Structures" Proceedings of the Seventh International Conference on Information Visualization, Infovis. IEEE Symposium, Jul. 16-18, 2003, Piscataway, NJ, USA, IEEE, Jul. 16, 2003, pp. 479-484, XP010648809 (2003).

(56) References Cited

OTHER PUBLICATIONS

O'Neill et al., "Disco: Intelligent Help for Document Review," 12th International Conference on Artificial Intelligence and Law, Barcelona, Spain, Jun. 8, 2009, pp. 1-10, ICAIL 2009, Association for Computing Machinery, Red Hook, New York (Online); XP 002607216.

McNee, "Meeting User Information Needs in Recommender Systems," Ph.D. Dissertation, University of Minnesota-Twin Cities, Jun. 2006.

Bier et al. "Toolglass and Magic Lenses: The See-Through Interface", Computer Graphics Proceedings, Proceedings of Siggraph Annual International Conference on Computer Graphics and Interactive Techniques, pp. 73-80, XP000879378 (Aug. 1993).

Chung et al., "Thematic Mapping-From Unstructured Documents to Taxonomies," CIKM'02, Nov. 4-9, 2002, pp. 608-610, ACM, McLean, Virginia, USA (Nov. 4, 2002).

Davison et al., "Brute Force Estimation of the Number of Human Genes Using EST Clustering as a Measure," IBM Journal of Research & Development, vol. 45, pp. 439-447 (May 2001).

Eades et al. "Multilevel Visualization of Clustered Graphs," Department of Computer Science and Software Engineering, University of Newcastle, Australia, Proceedings of Graph Drawing '96, Lecture Notes in Computer Science, NR. 1190 (Sep. 1996).

Estivill-Castro et al. "Amoeba: Hierarchical Clustering Based on Spatial Proximity Using Delaunaty Diagram", Department of Computer Science, The University of Newcastle, Australia, 1999 ACM Sigmod International Conference on Management of Data, vol. 28, No. 2, Jun. 1, 1999, Jun. 3, 1999, pp. 49-60, Philadelphia, PA, USA (Jun. 1999).

F. Can, Incremental Clustering for Dynamic Information Processing: ACM Transactions on Information Systems, ACM, New York, NY, US, vol. 11, No. 2, pp. 143-164, XP-002308022 (Apr. 1993).

Fekete et al., "Excentric Labeling: Dynamic Neighborhood Labeling for Data Visualization," CHI 1999 Conference Proceedings Human Factors in Computing Systems, Pittsburgh, PA, pp. 512-519 (May 15-20, 1999).

Jain et al., "Data Clustering: A Review," ACM Computing Surveys, vol. 31, No. 3, Sep. 1999, pp. 264-323, New York, NY, USA (Sep. 1999).

Kanungo et al., "The Analysis of a Simple K-Means Clustering Algorithm," pp. 100-109, Proc 16th annual symposium of computational geometry (May 2000).

M. Kurimo, "Fast Latent Semantic Indexing of Spoken Documents by Using Self-Organizing Maps" IEEE International Conference on Accoustics, Speech, and Signal Processing, vol. 6, pp. 2425-2428 (Jun. 2000).

Lio et al., "Funding Pathogenicity Islands and Gene Transfer Events in Genome Data," Bioinformatics, vol. 16, pp. 932-940, Department of Zoology, University of Cambridge, UK (Jan. 25, 2000).

Artero et al., "Viz3D: Effective Exploratory Visualization of Large Multidimensional Data Sets," IEEE Computer Graphics and Image Processing, pp. 340-347 (Oct. 20, 2004).

Magarshak, Theory & Practice. Issue 01. May 17, 2000. http://www.flipcode.com/articles/tp.sub.--issue01-pf.shtml (May 17, 2000).

Maria Cristin Ferreira De Oliveira et al., "From Visual Data Exploration to Visual Data Mining: A Survey," Jul.-Sep. 2003, IEEE Transactions on Visualization and Computer Graphics, vol. 9, No. 3, pp. 378-394 (Jul. 2003).

S.S. Weng, C.K. Liu, "Using text classification and multiple concepts to answer e-mails." Expert Systems with Applications, 26 (2004), pp. 529-543.

\* cited by examiner

SYSTEM AND METHOD FOR DISPLAYING RELATIONSHIPS BETWEEN CONCEPTS TO PROVIDE CLASSIFICATION SUGGESTIONS VIA INCLUSION

CROSS-REFERENCE TO RELATED APPLICATION

This non-provisional patent application claims priority under 35 U.S.C. §119(e) to U.S. Provisional Patent Application Ser. No. 61/229,216, filed Jul. 28, 2009, and U.S. Provisional Patent Application Ser. No. 61/236,490, filed Aug. 24, 2009, the disclosures of which are incorporated by reference.

FIELD

This application relates in general to using documents as a reference point and, in particular, to a system and method for displaying relationships between concepts to provide classification suggestions via inclusion.

BACKGROUND

Historically, document review during the discovery phase of litigation and for other types of legal matters, such as due diligence and regulatory compliance, have been conducted manually. During document review, individual reviewers, generally licensed attorneys, are assigned sets of documents for coding. A reviewer must carefully study each document and categorize the document by assigning a code or other marker from a set of descriptive classifications, such as "privileged," "responsive," and "non-responsive." The classifications can affect the disposition of each document, including admissibility into evidence.

During discovery, document review can potentially affect the outcome of the underlying legal matter, so consistent and accurate results are crucial. Manual document review is tedious and time-consuming. Marking documents is solely at the discretion of each reviewer and inconsistent results may occur due to misunderstanding, time pressures, fatigue, or other factors. A large volume of documents reviewed, often with only limited time, can create a loss of mental focus and a loss of purpose for the resultant classification. Each new reviewer also faces a steep learning curve to become familiar with the legal matter, classification categories, and review techniques.

Currently, with the increasingly widespread movement to electronically stored information (ESI), manual document review is no longer practicable. The often exponential growth of ESI exceeds the bounds reasonable for conventional manual human document review and underscores the need for computer-assisted ESI review tools.

Conventional ESI review tools have proven inadequate to providing efficient, accurate, and consistent results. For example, DiscoverReady LLC, a Delaware limited liability company, custom programs ESI review tools, which conduct semi-automated document review through multiple passes over a document set in ESI form. During the first pass, documents are grouped by category and basic codes are assigned. Subsequent passes refine and further assign codings. Multiple pass review requires a priori project-specific knowledge engineering, which is only useful for the single project, thereby losing the benefit of any inferred knowledge or know-how for use in other review projects.

Thus, there remains a need for a system and method for increasing the efficiency of document review that bootstraps knowledge gained from other reviews while ultimately ensuring independent reviewer discretion.

SUMMARY

Document review efficiency can be increased by identifying relationships between reference documents and uncoded documents and providing a suggestion for classification based on the relationships. The reference documents and uncoded documents are clustered based on a similarity of the documents. The clusters and the relationship between the uncoded documents and reference documents within the cluster are visually depicted. The visual relationship of the uncoded documents and reference documents provide a suggestion regarding classification for the uncoded documents.

One embodiment provides a system and for displaying relationships between concepts to provide classification suggestions via inclusion. A set of reference concepts each associated with a classification code is designated. One or more of the reference concepts are combined with a set of uncoded concepts. Clusters of the uncoded concepts and the one or more reference concepts are generated. Relationships between the uncoded concepts and the one or more reference concepts in at least one cluster are visually depicted as suggestions for classifying the uncoded concepts in that cluster.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
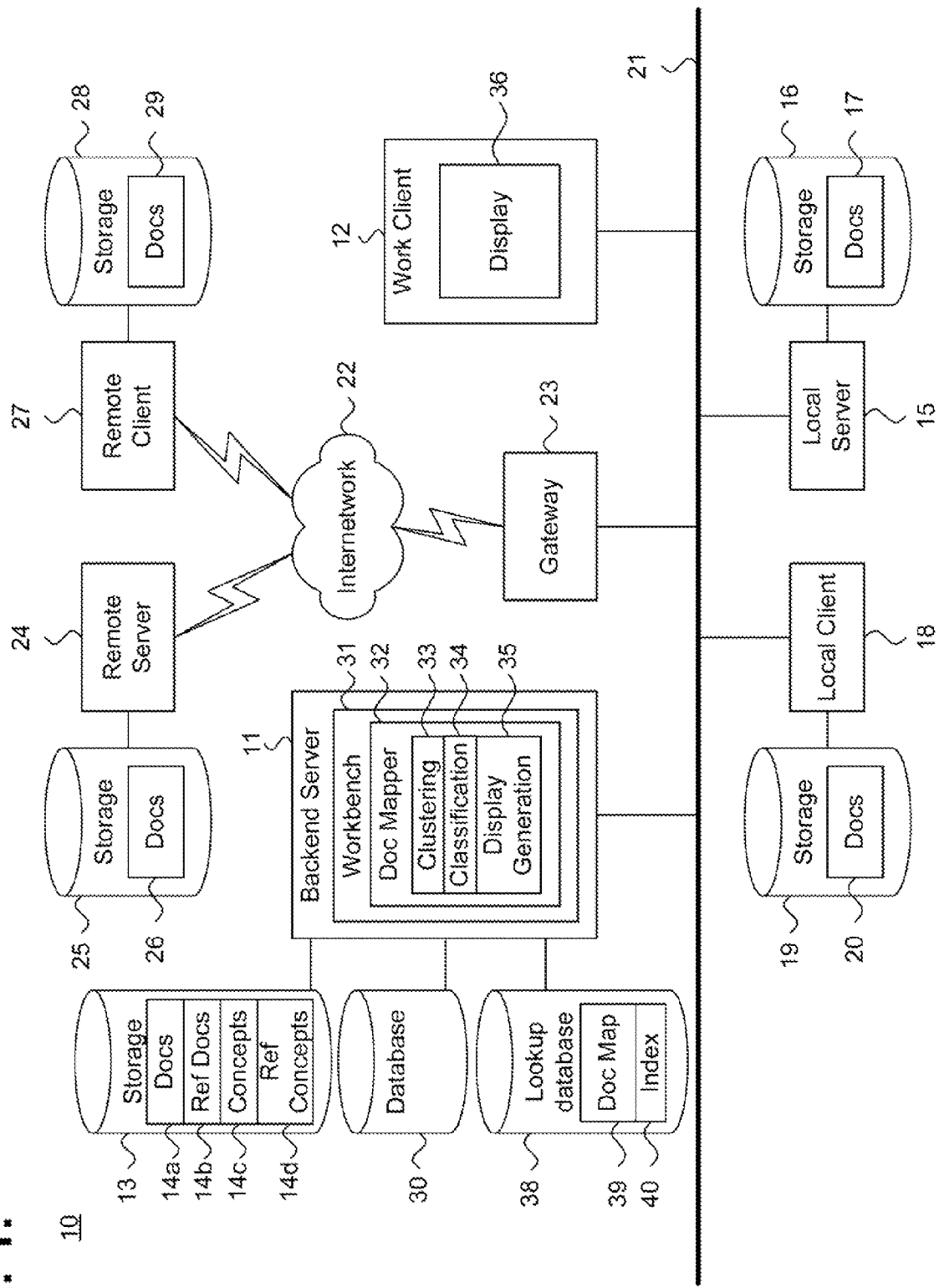
FIG. 1 is a block diagram showing a system for displaying relationships between concepts to provide classification suggestions via inclusion, in accordance with one embodiment.

The ever-increasing volume of ESI underlies the need for automating document review for improved consistency and throughput. Token clustering via injection utilizes reference, or previously classified tokens, which offer knowledge gleaned from earlier work in similar legal projects, as well as a reference point for classifying uncoded tokens.

The tokens can include word-level, symbol-level, or character-level n-grams, raw terms, entities, or concepts. Other tokens, including other atomic parse-level elements, are possible. An n-gram is a predetermined number of items selected from a source. The items can include syllables, letters, or words, as well as other items. A raw term is a term that has not been processed or manipulated. Entities further refine nouns and noun phrases into people, places, and things, such as meetings, animals, relationships, and various other objects. Additionally, entities can represent other parts of grammar associated with semantic meanings to disambiguate different instances or occurrences of the grammar. Entities can be extracted using entity extraction techniques known in the field.

Concepts are collections of nouns and noun-phrases with common semantic meaning that can be extracted from ESI, including documents, through part-of-speech tagging. Each concept can represent one or more documents to be classified during a review. Clustering of the concepts provides an overall view of the document space, which allows users to easily identify documents sharing a common theme.

The clustering of tokens, for example, concepts, differs from document clustering, which groups related documents individually. In contrast, concept clustering groups related concepts, which are each representative of one or more related documents. Each concept can express an ideas or topic that may not be expressed by individual documents. A concept is analogous to a search query by identifying documents associated with a particular idea or topic.

A user can determine how particular concepts are related based on the concept clustering. Further, users are able to intuitively identify documents by selecting one or more associated concepts in a cluster. For example, a user may wish to identify all documents in a particular corpus that are related to car manufacturing. The user can select the concept "car manufacturing" or "vehicle manufacture" within one of the clusters and subsequently, the associated documents are presented. However, during document clustering, a user is first required to select a specific document from which other documents that are similarly related can then be identified.

Providing Suggestions Using Reference Concepts

Reference concepts are previously classified based on the document content represented by that concept and can be injected into clusters of uncoded, that is unclassified, concepts to influence classification of the uncoded concepts. Specifically, relationships between an uncoded concept and the reference concepts, in terms of semantic similarity or distinction, can be used as an aid in providing suggestions for classifying uncoded concepts. Once classified, the newly-coded, or reference, concepts can be used to further classify the represented documents. Although tokens, such as word-level or character-level grams, raw terms, entities, or concepts, can be clustered and displayed, the discussion below will focus on a concept as a particular token.

Complete ESI review requires a support environment within which classification can be performed. FIG. 1 is a block diagram showing a system 10 for displaying relationships between concepts to provide classification suggestions via inclusion, in accordance with one embodiment. By way of illustration, the system 10 operates in a distributed computing environment, which includes a plurality of heterogeneous systems and ESI sources. Henceforth, a single item of ESI will be referenced as a "document," although ESI can include other forms of non-document data, as described infra. A backend server 11 is coupled to a storage device 13, which stores documents 14$a$ in the form of structured or unstructured data, a database 30 for maintaining information about the documents, a lookup database 38 for storing many-to-many mappings 39 between documents and document features, and a concept document index 40, which maps documents to concepts. The storage device 13 also stores classified documents 14$b$, concepts 14 $c$, and reference concepts 14$d$. Concepts are collections of nouns and noun-phrases with common semantic meaning. The nouns and noun-phrases can be extracted from one or more documents in the corpus for review. Hereinafter, the terms "classified" and "coded" are used interchangeably with the same intended meaning, unless otherwise indicated. A set of reference concept s can be hand-selected or automatically selected through guided review, which is further discussed below. Additionally, the set of reference concept s can be predetermined or can be generated dynamically, as uncoded concept s are classified and subsequently added to the set of reference concept s.

The backend server 11 is coupled to an intranetwork 21 and executes a workbench suite 31 for providing a user interface framework for automated document management, processing, analysis, and classification. In a further embodiment, the backend server 11 can be accessed via an internetwork 22. The workbench software suite 31 includes a document mapper 32 that includes a clustering engine 33, similarity searcher 34, classifier 35, and display generator 36. Other workbench suite modules are possible.

The clustering engine 33 performs efficient document scoring and clustering of uncoded concept s and reference concept s, such as described in commonly-assigned U.S. Pat. No. 7,610,313, the disclosure of which is incorporated by reference. Clusters of uncoded concept s 14$c$ and reference concept s 14$d$ are formed and organized along vectors, known as spines, based on a similarity of the clusters. The similarity can be expressed in terms of distance. Concept clustering is further discussed below with reference to FIG. 5. The classifier 35 provides a machine-generated suggestion and confidence level for classification of selected uncoded concept s 14$c$, clusters, or spines, as further described below with reference to FIG. 8.

Figure 2:
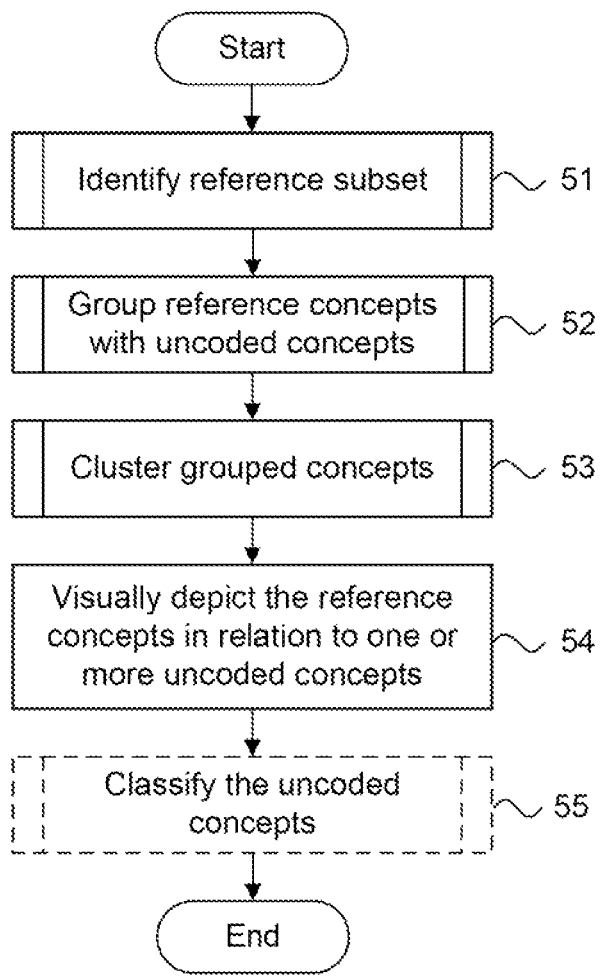
FIG. 2 is a process flow diagram showing a method for displaying relationships between concepts to provide classification suggestions via inclusion, in accordance with one embodiment.

The display generator 36 arranges the clusters and spines in thematic relationships in a two-dimensional visual display space, as further described below beginning with reference to FIG. 2. Once generated, the visual display space is transmitted to a work client 12 by the backend server 11 via the document mapper 32 for presenting to a reviewer on a display 37. The reviewer can include an individual person who is assigned to review and classify one or more uncoded concept s by designating a code. Hereinafter, the terms "reviewer" and "custodian" are used interchangeably with the same intended meaning, unless otherwise indicated. Other types of reviewers are possible, including machine-implemented reviewers.

The document mapper 32 operates on uncoded concept s 14$a$, which can be retrieved from the storage 13, as well as from a plurality of local and remote sources. As well, the local and remote sources can also store the reference documents 14b, concepts 14c, and reference concepts 14d. The local sources include documents and concepts 17 maintained in a storage device 16 coupled to a local server 15, and documents and concepts 20 maintained in a storage device 19 coupled to a local client 18. The local server 15 and local client 18 are interconnected to the backend server 11 and the work client 12 over an intranetwork 21. In addition, the document mapper 32 can identify and retrieve concepts from remote sources over an internetwork 22, including the Internet, through a gateway 23 interfaced to the intranetwork 21. The remote sources include documents and concepts 26 maintained in a storage device 25 coupled to a remote server 24, and documents and concepts 29 maintained in a storage device 28 coupled to a remote client 27. Other document sources, either local or remote, are possible.

The individual documents 14a, 14b, 17, 20, 26, 29 include all forms and types of structured and unstructured ESI, including electronic message stores, word processing documents, electronic mail (email) folders, Web pages, and graphical or multimedia data. Notwithstanding, the documents could be in the form of structurally organized data, such as stored in a spreadsheet or database.

In one embodiment, the individual documents 14a, 14b, 17, 20, 26, 29 include electronic message folders storing email and attachments, such as maintained by the Outlook and Outlook Express products, licensed by Microsoft Corporation, Redmond, Wash. The database can be an SQL-based relational database, such as the Oracle database management system, Release 8, licensed by Oracle Corporation, Redwood Shores, Calif.

Additionally, the individual concepts 14c, 14d, 17, 20, 26, 29 include uncoded concepts 14c and reference concepts 14d. The uncoded concepts 14c, which are unclassified, represent collections of nouns and noun-phrases that are semantically related and extracted from documents in a document review project.

The reference concepts 14d are initially uncoded concepts that can represent documents selected from the corpus or other sources of documents. The reference concepts 14d assist in providing suggestions for classification of the remaining uncoded concepts representative of the document corpus based on visual relationships between the uncoded concepts and reference concepts. The reviewer can classify one or more of the remaining uncoded concepts by assigning a classification code based on the relationships. In a further embodiment, the reference concepts can be used as a training set to form machine-generated suggestions for classifying the remaining encoded concepts, as further described below with reference to FIG. 8.

The concept corpus for a document review project can be divided into subsets of uncoded concepts, which are each provided to a particular reviewer as an assignment. The uncoded documents are analyzed to identify concepts, which are subsequently clustered. A classification code can be assigned to each of the clustered concepts. To maintain consistency, the same codes can be used across all concepts representing assignments in the document review project. The classification codes can be determined using taxonomy generation, during which a list of classification codes can be provided by a reviewer or determined automatically. The classification code of a concept can be assigned to the documents associated with that concept.

For purposes of legal discovery, the list of classification codes can include "privileged," "responsive," or "non-responsive," however, other classification codes are possible. The assigned classification codes can be used as suggestions for classification of associated documents. For example, a document associated with three concepts, each assigned a "privileged" classification can also be considered "privileged." Other types of suggestions are possible. A "privileged" document contains information that is protected by a privilege, meaning that the document should not be disclosed or "produced" to an opposing party. Disclosing a "privileged" document can result in an unintentional waiver of the subject matter disclosed. A "responsive" document contains information that is related to the legal matter, while a "non-responsive" document includes information that is not related to the legal matter.

The system 10 includes individual computer systems, such as the backend server 11, work server 12, server 15, client 18, remote server 24 and remote client 27. The individual computer systems are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. The various implementations of the source code and object and byte codes can be held on a computer-readable storage medium, such as a floppy disk, hard drive, digital video disk (DVD), random access memory (RAM), read-only memory (ROM) and similar storage mediums. For example, program code, including software programs, and data are loaded into the RAM for execution and processing by the CPU and results are generated for display, output, transmittal, or storage.

Identifying relationships between the reference concepts and uncoded concepts includes clustering. FIG. 2 is a process flow diagram showing a method 50 for displaying relationships between concepts to provide classification suggestions via inclusion, in accordance with one embodiment. A subset of reference concepts is identified and selected (block 51) from a representative set of reference concepts. The subset of reference concepts can be predefined, arbitrary, or specifically selected, as discussed further below with reference to FIG. 3. Upon identification, the reference concept subset is grouped with uncoded concepts (block 52). The uncoded concepts can include all uncoded concepts in an assignment or in a corpus. The grouped concepts, including uncoded and reference concepts are organized into clusters (block 53). Clustering of the concepts is discussed further below with reference to FIG. 5.

Once formed, the clusters can be displayed to visually depict relationships (block 54) between the uncoded concepts and the reference concepts. The relationships can provide a suggestion, which can be used by an individual reviewer for classifying one or more of the uncoded concepts, clusters, or spines. Based on the relationships, the reviewer can classify the uncoded concepts, clusters, or spines by assigning a classification code, which can represent a relevancy of the uncoded concept to the document review project. Further, machine classification can provide a suggestion for classification, including a classification code, based on a calculated confidence level (block 55). Classifying uncoded concepts is further discussed below with reference to FIG. 8.

In one embodiment, the classified concepts can be used as suggestions for classifying those documents represented by that concept. For example, in a product liability lawsuit, the plaintiff claims that a wood composite manufactured by the defendant induces and harbors mold growth. During discovery, all documents within the corpus for the lawsuit and relating to mold should be identified for review. The concept for mold is clustered and includes a "responsive" classification code, which indicates that the noun phrase mold is related to the legal matter. Upon selection of the mold concept, all documents that include the noun phrase mold can be identified using the mapping matrix, which is described below with reference to FIG. 3. The responsive classification code assigned to the concept can be used as a suggestion for the document classification. However, if the document is represented by multiple concepts with different classification codes, each different code can be considered during classification of the document.

In a further embodiment, the concept clusters can be used with document clusters, which are described in commonly-owned in U.S. patent application Ser. No. 12/833,860, entitled "System and Method for Displaying Relationships Between Electronically Stored Information to Provide Classification Suggestions via Inclusion," filed Jul. 9, 2010, pending, and U.S. patent application Ser. No. 12/833,872, entitled "System and Method for Displaying Relationships Between Electronically Stored Information to Provide Classification Suggestions via Injection," filed Jul. 9, 2010, pending, the disclosures of which is incorporated by reference. For example, selecting a concept in the concept cluster display can identify one or more documents with a common idea or topic. Further selection of one of the documents represented by the selected cluster in the document concept display can identify documents that are similarly related to the content of the selected document. The identified documents can be the same or different as the other documents represented by the concept.

Similar documents can also be identified as described in commonly-assigned U.S. patent application Ser. No. 12/833,880, entitled "System and Method for Displaying Relationships Between Electronically Stored Information to Provide Classification Suggestions via Nearest Neighbor," filed Jul. 9, 2010, pending, the disclosure of which is incorporated by reference.

In an even further embodiment, the documents identified from one of the concepts can be classified automatically as described in commonly-assigned U.S. patent application Ser. No. 12/833,769, entitled "System and Method for Providing a Classification Suggestion for Electronically Stored Information," filed Jul. 9, 2010, pending, the disclosure of which is incorporated by reference.

Identifying a Set and Subset of Reference Concepts

Prior to clustering, the uncoded concepts and reference concepts are obtained. The reference concepts used for clustering can include a particular subset of reference concepts, which are selected from a general set of reference concepts. Alternatively, the entire set of reference concepts can be clustered with the uncoded concepts. The set of reference concepts is representative of document in the corpus for a document review project in which data organization or classification is desired. The reference concept set can be previously defined and maintained for related concept review projects or can be specifically generated for each review project. A predefined reference set provides knowledge previously obtained during the related concept review project to increase efficiency, accuracy, and consistency. Reference sets newly generated for each review project can include arbitrary or customized reference sets that are determined by a reviewer or a machine.

The set of reference concepts can be generated during guided review, which assists a reviewer in building a reference concept set. During guided review, the uncoded concepts that are dissimilar to the other uncoded concepts are identified based on a similarity threshold. Other methods for determining dissimilarity are possible. Identifying a set of dissimilar concepts provides a group of uncoded concepts that is representative of the corpus for the document review project. Each identified dissimilar concept is then classified by assigning a particular classification code based on the content of the concept to collectively generate a set of reference concepts. Guided review can be performed by a reviewer, a machine, or a combination of the reviewer and machine.

Other methods for generating a reference concept set for a document review project using guided review are possible, including clustering. For example, a set of uncoded concepts to be classified is clustered, as described in commonly-assigned U.S. Pat. No. 7,610,313, the disclosure of which is incorporated by reference. A plurality of the clustered uncoded concepts are selected based on selection criteria, such as cluster centers or sample clusters. The cluster centers can be used to identify uncoded concepts in a cluster that are most similar or dissimilar to the cluster center. The identified uncoded concepts are then selected for classification by assigning classification codes. After classification, the concepts represent a reference set. In a further embodiment, sample clusters can be used to generate a reference concept set by selecting one or more sample clusters based on cluster relation criteria, such as size, content, similarity, or dissimilarity. The uncoded concepts in the selected sample clusters are then assigned classification codes. The classified concepts represent a concept reference set for the document review project. Other methods for selecting concepts for use as a reference set are possible.

Figure 3:
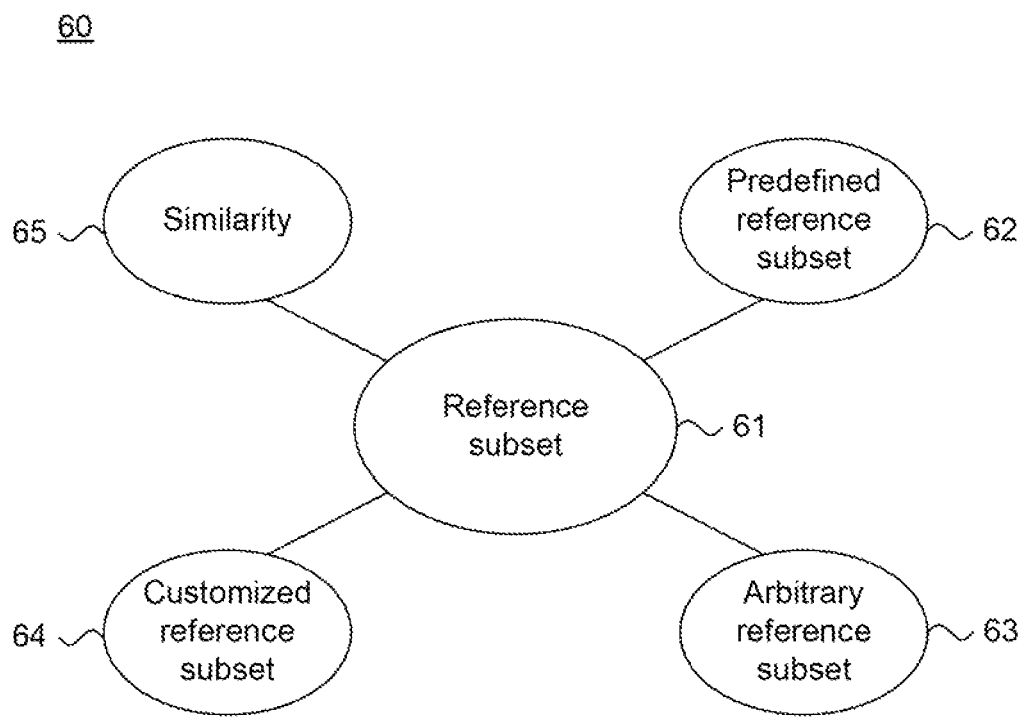
FIG. 3 is a block diagram showing, by way of example, measures for selecting reference concept subsets for use in the method of FIG. 2.

Once generated, a subset of reference concepts is selected from the reference concept set for clustering with uncoded concepts. FIG. 3 is a block diagram showing, by way of example, measures 60 for selecting reference concept subsets 61 for use in the method of FIG. 2. A reference concept subset 61 includes one or more reference concepts selected from a set of reference concepts associated with a document review project for use in clustering with uncoded concepts. The reference concept subset can be predefined 62, customized 64, selected arbitrarily 63, or based on similarity 65.

A subset of predefined reference concepts 62 can be selected from a reference set, which is associated with another document review project that is related to the current document review project. An arbitrary reference subset 63 includes reference concepts randomly selected from a reference set, which can be predefined or newly generated for the current document review project or a related document review project. A customized reference subset 64 includes reference concepts specifically selected from a current or related reference set based on criteria, such as reviewer preference, classification category, document source, content, and review project. Other criteria are possible. The number of reference concepts in a subset can be determined automatically or by a reviewer based on reference factors, such as a size of the document review project, an average size of the assignments, types of classification codes, and a number of reference concepts associated with each classification code. Other reference factors are possible. In a further embodiment, the reference concept subset can include more than one occurrence of a reference concept. Other types of reference concept subsets and methods for selecting the reference concept subsets are possible.

Forming Clusters

Once identified, the reference concept subset can be used for clustering with uncoded concept representative of a corpus for a particular document review project. The corpus of uncoded concepts for a review project can be divided into assignments using assignment criteria, such as custodian or source of the uncoded concept, content, document type, and date. Other criteria are possible. In one embodiment, each assignment is assigned to an individual reviewer for analysis. The assignments can be separately clustered with the reference concept subset or alternatively, all of the uncoded concepts in the corpus can be clustered with the reference concept subset. The assignments can be separately analyzed or alternatively, analyzed together to determine concepts for the one or more document assignments. The content of each document within the corpus can be converted into a set of concepts. As described above, concepts typically include nouns and noun phrases obtained through part-of-speech tagging that have a common semantic meaning. The concepts, which are representative of the documents can be clustered to provide an intuitive grouping of the document content.

Figure 4:
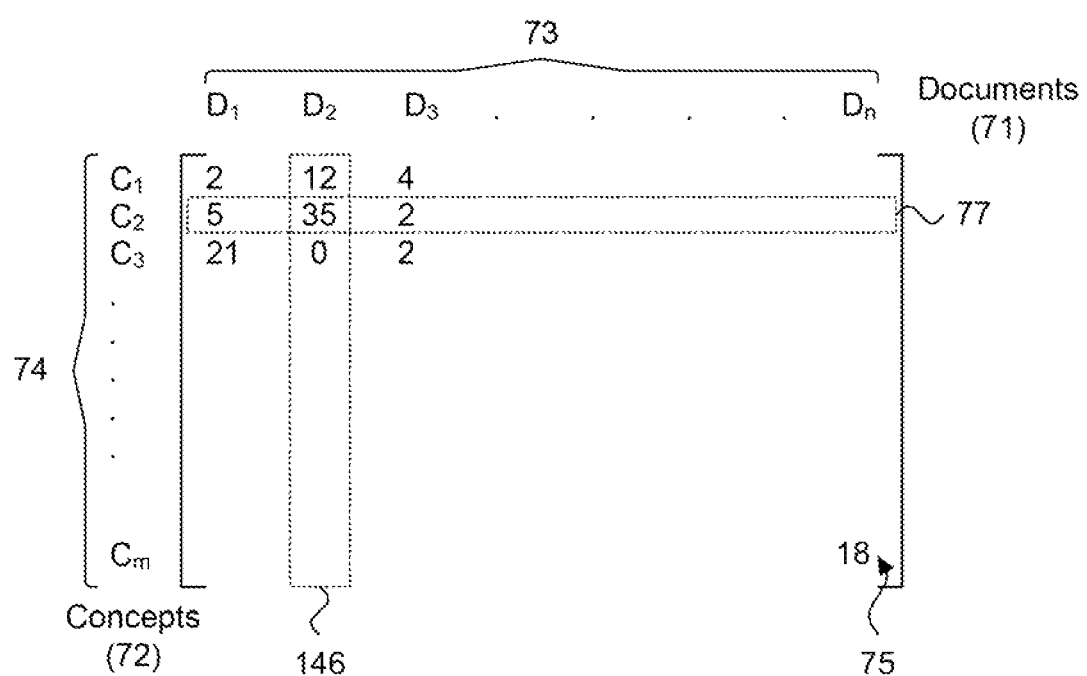
FIG. 4 is a table showing, by way of example, a matrix mapping of uncoded concepts and documents.

Clustering of the uncoded concepts provides groupings of related uncoded concepts and is based on a similarity metric using score vectors assigned to each uncoded concept. The score vectors can be generated using a matrix showing the uncoded concepts in relation to documents that contain the concepts. FIG. 4 is a table showing, by way of example, a matrix mapping 70 of uncoded concepts 74 and documents 73. The uncoded documents 73 are listed along a horizontal dimension 71 of the matrix, while the concepts 74 are listed along a vertical dimension 72. However, the placement of the uncoded documents 73 and concepts 74 can be reversed. Each cell 75 within the matrix 70 includes a cumulative number of occurrences of each concept within a particular uncoded document 73. Score vectors can be generated for each document by identifying the concepts and associated weights within that document and ordering the concepts along a vector with the associated concept weight. In the matrix 70, the score vector 76 for a document 73 can be identified as all the concepts included in that document and the associated weights, which are based on the number of occurrences of each concept. Score vectors can also be generated for each concept by identifying the documents that contain that concept and determining a weight associated with each document. The documents and associated weights are then ordered along a vector for each concept, as the concept score vector. In the matrix 70, the score vector 77 for a concept can be identified as all the documents that contain that concept and the associated weights.

Figure 5:
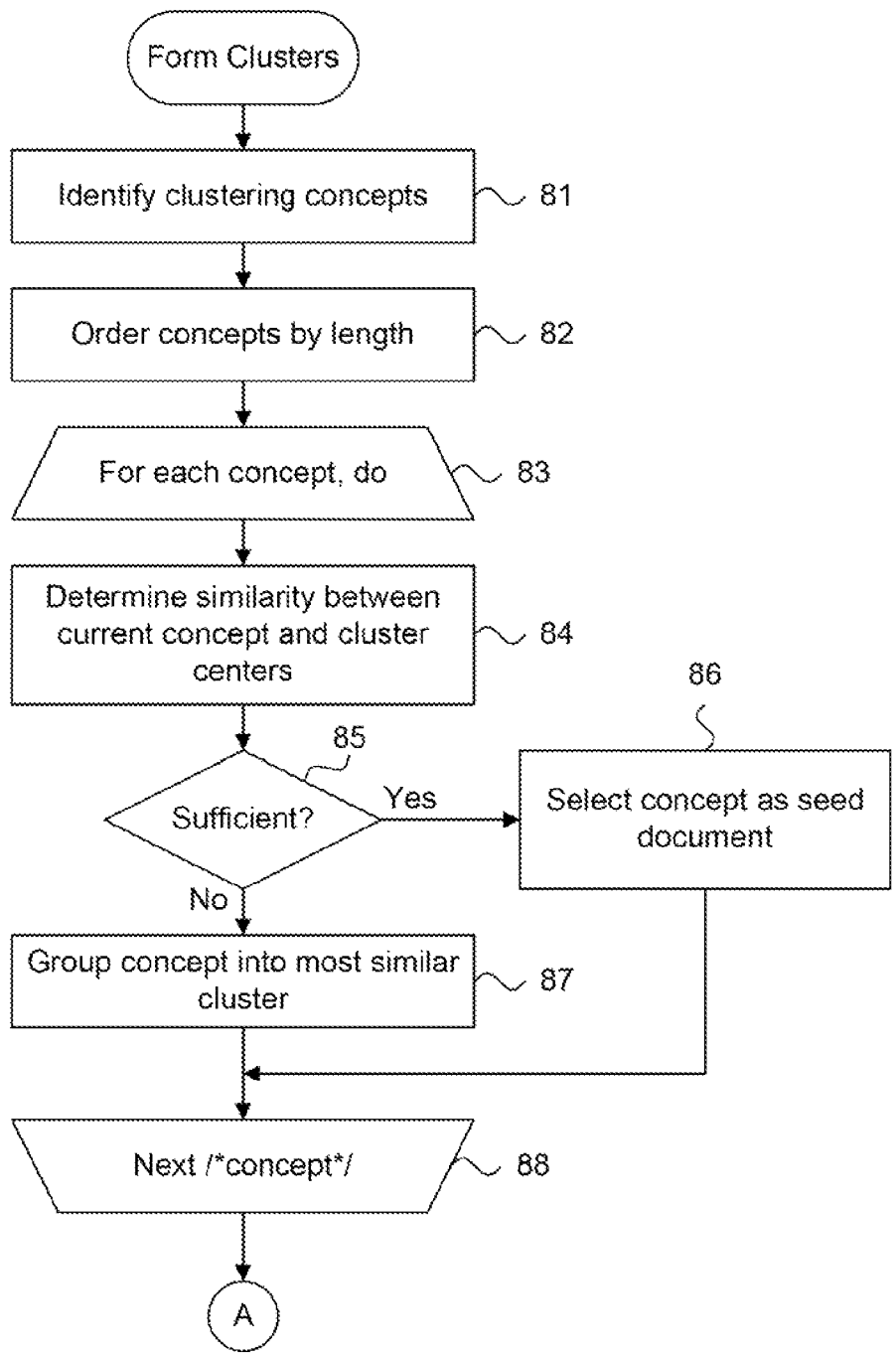
FIG. 5 is a process flow diagram showing, by way of example, a method for forming clusters for use in the method of FIG. 2.
Figure 5:
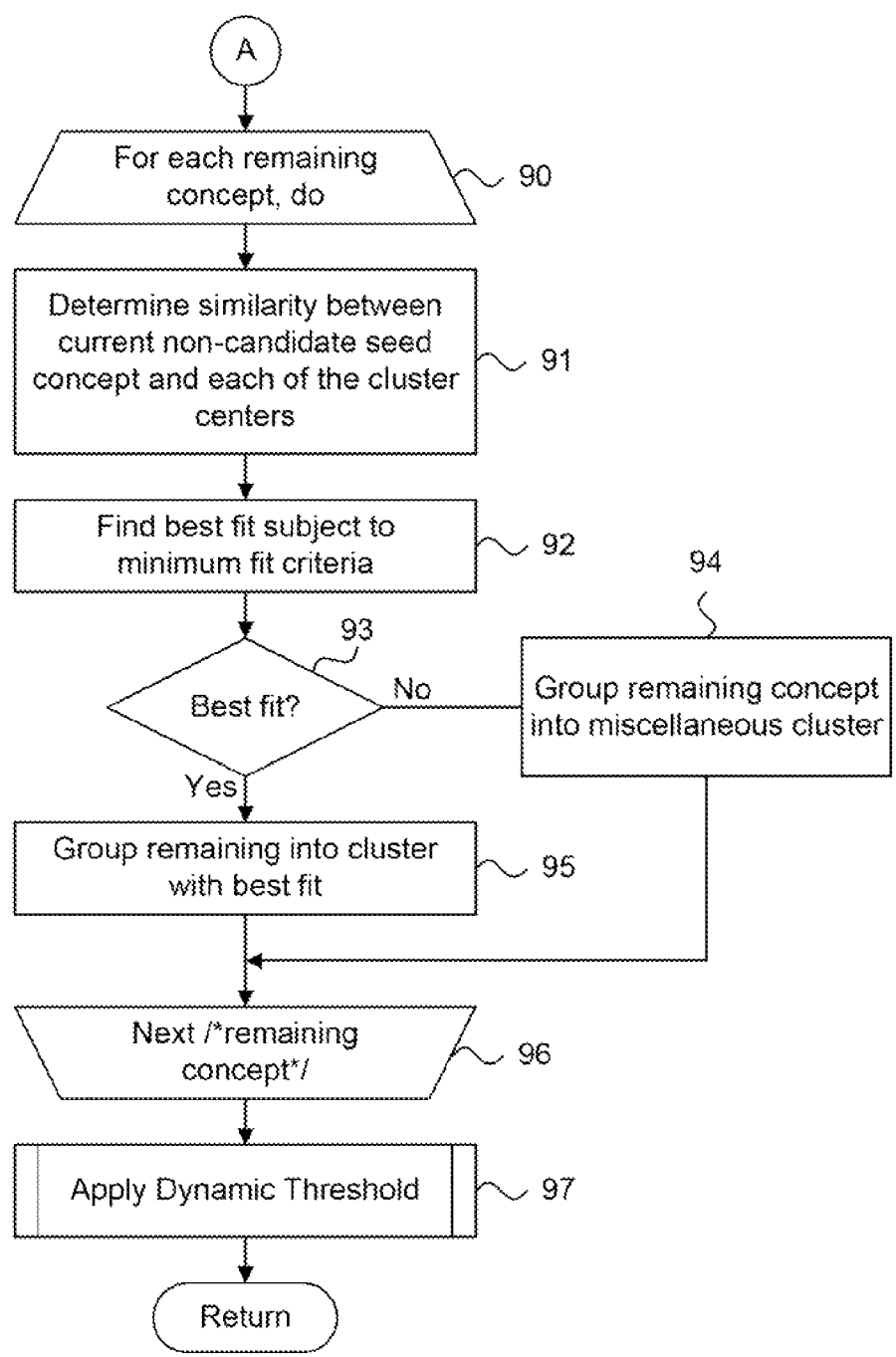

Clustering provides groupings of related uncoded concepts and reference concepts. FIG. 5 is a flow diagram showing a routine 80 for forming clusters for use in the method 40 of FIG. 2. The purpose of this routine is to use score vectors associated with the concepts, including uncoded and reference concepts, to form clusters based on relative similarity. Hereinafter, the term "concept" is intended to include uncoded concepts and reference concepts selected for clustering, unless otherwise indicated. The score vector associated with each concept includes a set of paired values of documents and associated weights, which are based on scores. The score vector is generated by scoring the documents, as described in commonly-assigned U.S. Pat. No. 7,610,313, the disclosure of which is incorporated by reference.

As an initial step for generating score vectors, each document within a concept is individually scored. Next, a normalized score vector is created for the concept by identifying paired values, consisting of a document represented by that concept and the scores for that document. The paired values are ordered along a vector to generate the score vector. The paired values can be ordered based on the documents, as well as other factors. For example, assume a normalized score vector for a first Concept A is $\vec{S}_A=\{(5, 0.5), (120, 0.75)\}$ and a normalized score vector for another Concept B is $\vec{S}_B=\{(3, 0.4), (5, 0.75), (47, 0.15)\}$. Concept A has scores corresponding to tokens '5' and '120' and Concept B has scores corresponding to tokens '3,' '5' and '47.' Thus, these concepts only have token '5' in common. Once generated, the score vectors can be compared to determine similarity or dissimilarity between the corresponding concepts during clustering.

The routine for forming clusters of concepts, including uncoded concepts and reference concepts, proceeds in two phases. During the first phase (blocks 83-88), the concepts are evaluated to identify a set of seed concepts, which can be used to form new clusters. During the second phase (blocks 90-96), any concepts not previously placed are evaluated and grouped into the existing clusters based on a best-fit criterion.

Initially, a single cluster is generated with one or more concepts as seed concepts and additional clusters of concepts are added, if necessary. Each cluster is represented by a cluster center that is associated with a score vector, which is representative of all the documents associated with concepts in that cluster. The cluster center score vector can be generated by comparing the score vectors for the individual concepts in the cluster and identifying common documents shared by the concepts. The most common documents and associated weights are ordered along the cluster center score vector. Cluster centers and thus, cluster center score vectors may continually change due to the addition and removal of concepts during clustering.

During clustering, the concepts are identified (block 81) and ordered by length (block 82). The concepts can include all reference concepts in a subset and one or more assignments of uncoded concepts. Each concept is then processed in an iterative processing loop (blocks 83-88) as follows. The similarity between each concept and a center of each cluster is determined (block 84) as the cosine (cos) σ of the score vectors for the concept and cluster being compared. The cos σ provides a measure of relative similarity or dissimilarity between the concepts associated with the documents and is equivalent to the inner products between the score vectors for the concept and cluster center.

In the described embodiment, the cos σ is calculated in accordance with the equation:

$$\cos\sigma_{AB} = \frac{\langle \vec{S}_A \cdot \vec{S}_B \rangle}{|\vec{S}_A||\vec{S}_B|}$$

where cos $\sigma_{AB}$ comprises the similarity metric between Concept A and cluster center B, $\vec{S}_A$ comprises a score vector for the Concept A, and $\vec{S}_B$ comprises a score vector for the cluster center B. Other forms of determining similarity using a distance metric are feasible, as would be recognized by one skilled in the art. An example includes using Euclidean distance.

Only those concepts that are sufficiently distinct from all cluster centers (block 85) are selected as seed concepts for forming new clusters (block 86). If the concept being compared is not sufficiently distinct (block 85), the concept is then grouped into a cluster with the most similar cluster center (block 87). Processing continues with the next concept (block 88).

In the second phase, each concept not previously placed is iteratively processed in an iterative processing loop (blocks 90-96) as follows. Again, the similarity between each remaining concept and each of the cluster centers is determined based on a distance (block 91), such as the cos σ of the normalized score vectors for each of the remaining concepts and the cluster centers. A best fit between a remaining concept and a cluster center can be found subject to a minimum fit criterion (block 92). In the described embodiment, a minimum fit criterion of 0.25 is used, although other minimum fit criteria could be used. If a best fit is found (block 93), the remaining concept is grouped into the cluster having the best fit (block 95). Otherwise, the remaining concept is grouped into a miscellaneous cluster (block 94). Processing continues with the next remaining concept (block 96). Finally, a dynamic threshold can be applied to each cluster (block 97) to evaluate and strengthen concept membership in a particular cluster. The dynamic threshold is applied based on a cluster-by-cluster basis, as described in commonly-assigned U.S. Pat. No. 7,610,313, the disclosure of which is incorporated by reference. The routine then returns. Other methods and processes for forming clusters are possible.

Alternatively, clusters can be generated by injection as further described in commonly-owned U.S. patent application Ser. No. 12/844,792, entitled "System and Method for Displaying Relationships Between Concepts to Provide Classification Suggestions via Injection," filed Jul. 27, 2010, pending, the disclosure of which is incorporated by reference.

Once clustered, similar concepts can be identified as described in commonly-assigned U.S. patent application Ser. No. 12/844,813, entitled "System and Method for Displaying Relationships Between Electronically Stored Information to Provide Classification Suggestions via Nearest Neighbor," filed Jul. 27, 2010, pending, the disclosure of which is incorporated by reference.

Displaying the Reference Concepts

Once formed, the clusters of concepts can be can be organized to generate spines of thematically related clusters, as described in commonly-assigned U.S. Pat. No. 7,271,804, the disclosure of which is incorporated by reference. Each spine includes those clusters that share one or more concepts, which are placed along a vector. Also, the cluster spines can be positioned in relation to other cluster spines based on a theme shared by those cluster spines, as described in commonly-assigned U.S. Pat. No. 7,610,313, the disclosure of which is incorporated by reference. Each theme can include one or more concepts defining a semantic meaning. Organizing the clusters into spines and groups of cluster spines provides an individual reviewer with a display that presents the concepts according to a theme while maximizing the number of relationships depicted between the concepts.

Figure 6:
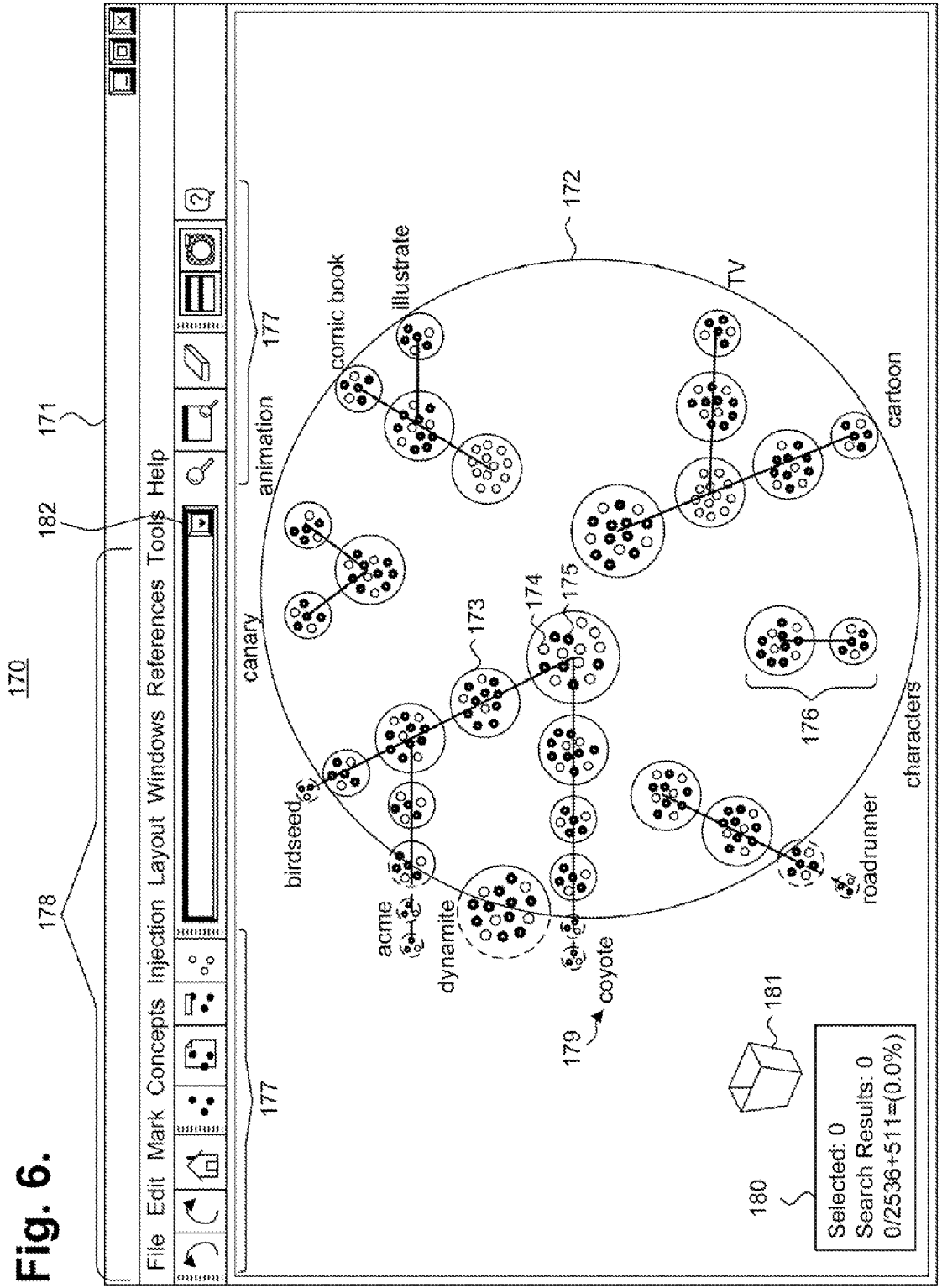
FIG. 6 is a screenshot showing, by way of example, a visual display of reference concepts in relation to uncoded documents.

FIG. 6 is a screenshot 100 showing, by way of example, a visual display 81 of reference concepts 105 in relation to uncoded concepts 104. Clusters 103 can be located along a spine, which is a straight vector, based on a similarity of the concepts 104, 105 in the clusters 103. Each cluster 103 is represented by a circle; however, other shapes, such as squares, rectangles, and triangles are possible, as described in U.S. Pat. No. 6,888,548, the disclosure of which is incorporated by reference. The uncoded concepts 104 are each represented by a smaller circle within the clusters 103, while the reference concepts 105 are each represented by a circle having a diamond shape within the boundaries of the circle. The reference concepts 105 can be further represented by their assigned classification code. The classification codes can include "privileged," "responsive," and "non-responsive" codes, as well as other codes. Each group of reference concepts associated with a particular classification code can be identified by a different color. For instance, "privileged" reference concepts can be colored blue, while "non-responsive" reference concepts are red and "responsive" reference concepts are green. In a further embodiment, the reference concepts for different classification codes can include different symbols. For example, "privileged" reference concepts can be represented by a circle with an "X" in the center, while "non-responsive" reference concepts can include a circle with striped lines and "responsive" reference concepts can include a circle with dashed lines. Other classification representations for the reference concepts are possible. Each cluster spine 86 is represented as a straight vector along which the clusters are placed.

The display 101 can be manipulated by an individual reviewer via a compass 102, which enables the reviewer to navigate, explore, and search the clusters 103 and spines 106 appearing within the compass 102, as further described in commonly-assigned U.S. Pat. No. 7,356,777, the disclosure of which is incorporated by reference. Visually, the compass 102 emphasizes clusters 103 located within the compass 102, while deemphasizing clusters 103 appearing outside of the compass 102.

Spine labels 109 appear outside of the compass 102 at an end of each cluster spine 106 to connect the outermost cluster of a cluster spine 106 to the closest point along the periphery of the compass 102. In one embodiment, the spine labels 109 are placed without overlap and circumferentially around the compass 102. Each spine label 109 corresponds to one or more documents represented by the clustered concepts that most closely describe the cluster spines 106. Additionally, the documents associated with each of the spine labels 109 can appear in a documents list (not shown) also provided in the display. Additionally, the cluster concepts for each of the spine labels 109 can appear in a documents list (not shown) also provided in the display. Toolbar buttons 107 located at the top of the display 101 enable a user to execute specific commands for the composition of the spine groups displayed. A set of pull down menus 108 provide further control over the placement and manipulation of clusters 103 and cluster spines 106 within the display 101. Other types of controls and functions are possible.

A concept guide 90 can be placed within the display 101. The concept guide 110 can include a "Selected" field, a "Search Results" field, and details regarding the numbers of uncoded concepts and reference concepts provided in the display. The number of uncoded concepts includes all uncoded concepts selected for clustering, such as within a corpus of uncoded concepts for a review project or within an assignment. The number of reference concepts includes the reference concept subset selected for clustering. The "Selected" field in the document guide 110 provides a number of concepts within one or more clusters selected by the reviewer. The reviewer can select a cluster by "double clicking" the visual representation of that cluster using a mouse. The "Search Results" field provides a number of uncoded concepts and reference concepts that include a particular search term identified by the reviewer in a search query box 112.

In one embodiment, a garbage can 111 is provided to remove documents, from consideration in the current set of clusters 103. Removed cluster documents prevent those documents from affecting future clustering, as may occur when a reviewer considers a document irrelevant to the clusters 103.

Figure 7A:
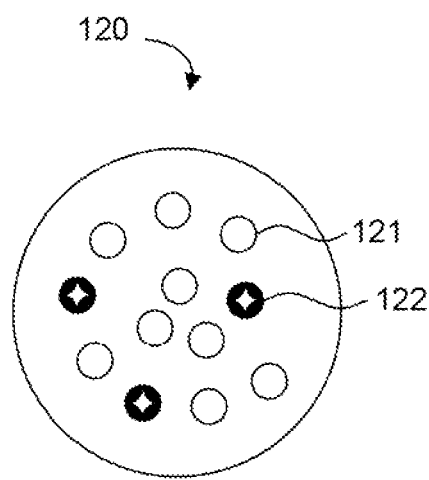
FIG. 7A is a block diagram showing, by way of example, a cluster with "privileged" reference concepts and uncoded concepts.

The display 101 provides a visual representation of the relationships between thematically-related concepts, including the uncoded concepts and reference concepts. The uncoded concepts and reference concepts located within a cluster or spine can be compared based on characteristics, such as the assigned classification codes of the reference concepts, a number of reference concepts associated with each classification code, and a number of different classification codes to identify relationships between the uncoded concepts and reference concepts. The reviewer can use the displayed relationships as suggestions for classifying the uncoded concepts. For example, FIG. 7A is a block diagram showing, by way of example, a cluster 120 with "privileged" reference concepts 122 and uncoded concepts 121. The cluster 120 includes nine uncoded concepts 121 and three reference concepts 122. Each reference concept 122 is classified as "privileged." Accordingly, based on the number of "privileged" reference concepts 122 present in the cluster 120, the absence of other classifications of reference concepts, and the thematic relationship between the uncoded concepts 94 and the "privileged" reference concepts 122, the reviewer may be more inclined to review the uncoded concepts 121 in that cluster 120 or to classify one or more of the uncoded concepts 121 as "privileged" without review.

Figure 7B:
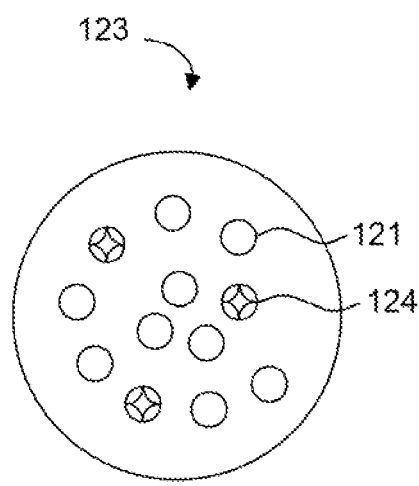
FIG. 7B is a block diagram showing, by way of example, a cluster with "non-responsive" reference concepts and uncoded concepts.

Alternatively, the three reference concepts can be classified as "non-responsive," instead of "privileged" as in the previous example. FIG. 7B is a block diagram showing, by way of example, a cluster 123 with "non-responsive" reference concepts 124 and uncoded concepts 121. The cluster 123 includes nine uncoded concepts 121 and three "non-responsive" concepts 124. Since the uncoded concepts 121 in the cluster are thematically related to the "non-responsive" reference concepts 124, the reviewer may wish to assign a "non-responsive" code to one or more of the uncoded concepts 121 without review, as they are most likely not relevant to the legal matter associated with the document review project. In making a decision to assign a code, such as "non-responsive," the reviewer can consider the number of "non-responsive" reference concepts in the cluster, the presence or absence of other reference concept classification codes, and the thematic relationship between the "non-responsive" reference concepts and the uncoded concepts. Thus, the presence of the three "non-responsive" reference concepts 124 in the cluster provides a suggestion that the uncoded concepts 121 may also be "non-responsive." Further, the label 109 associated with the spine 106 upon which the cluster is located can also be used to influence a suggestion.

Figure 7C:
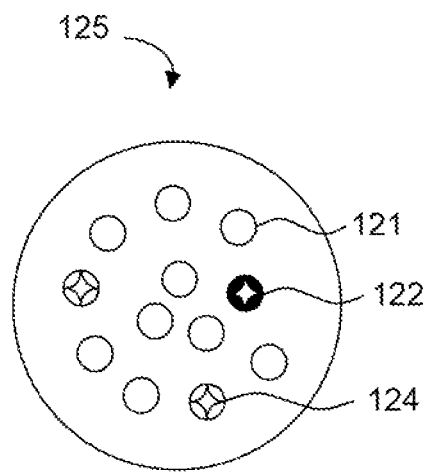
FIG. 7C is a block diagram showing, by way of example, a cluster with uncoded concepts and a combination of differently classified reference concepts.

A further example can include a cluster with combination of "privileged" and "non-responsive" reference concepts. For example, FIG. 7C is a block diagram showing, by way of example, a cluster 125 with uncoded concepts 121 and a combination of differently classified reference concepts 122, 124. The cluster 125 can include one "privileged" reference concept 122, two "non-responsive" reference concepts 124, and nine uncoded concepts 121. The "privileged" 122 and "non-responsive" 124 reference concepts can be distinguished by different colors or shape, as well as other identifiers. The combination of "privileged" 122 and "non-responsive" 124 reference concepts within the cluster 98 can suggest to a reviewer that the uncoded reference concepts 121 should be reviewed before classification or that one or more uncoded reference concepts 121 should be classified as "non-responsive" based on the higher number of "non-responsive" reference concepts 124 in the cluster 125. In making a classification decision, the reviewer may consider the number of "privileged" reference concepts 122 versus the number of "non-responsive" reference concepts 124, as well as the thematic relationships between the uncoded concepts 121 and the "privileged" 122 and "non-responsive" 124 reference concepts. Additionally, the reviewer can identify the closest reference concept to an uncoded concept and assign the classification code of the closest reference concept to the uncoded concept. Other examples, classification codes, and combinations of classification codes are possible.

Additionally, the reference concepts can also provide suggestions for classifying clusters and spines. The suggestions provided for classifying a cluster can include factors, such as a presence or absence of classified concepts with different classification codes within the cluster and a quantity of the classified concepts associated with each classification code in the cluster. The classification code assigned to the cluster is representative of the concepts in that cluster and can be the same as or different from one or more classified concepts within the cluster. Further, the suggestions provided for classifying a spine include factors, such as a presence or absence of classified concepts with different classification codes within the clusters located along the spine and a quantity of the classified concepts for each classification code. Other suggestions for classifying concepts, clusters, and spines are possible.

Classifying Uncoded Concepts

The display of relationships between the uncoded concepts and reference concepts can provide suggestions to an individual reviewer. The suggestions can indicate a need for manual review of the uncoded concepts, when review may be unnecessary, and hints for classifying the uncoded concepts. Additional information can be generated to assist the reviewer in making classification decisions for the uncoded concepts, such as a machine-generated confidence level associated with a suggested classification code, as described in common-assigned U.S. patent application Ser. No. 12/844,785, entitled "System and Method for Providing a Classification Suggestion for Concepts," filed on Jul. 27, 2010, pending, the disclosure of which is incorporated by reference.

Figure 8:
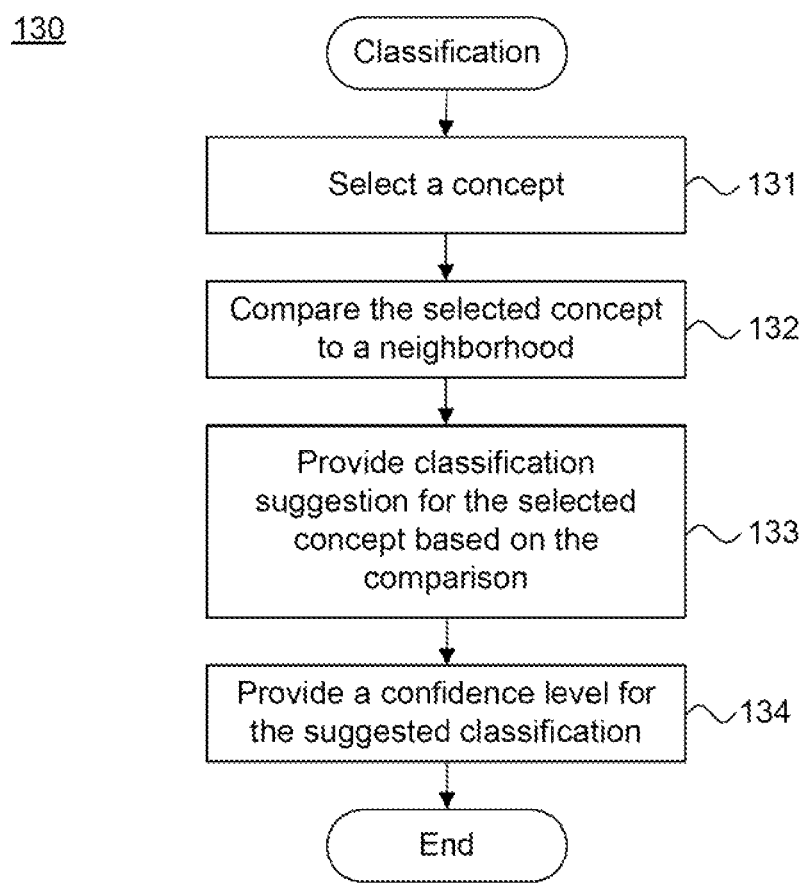
FIG. 8 is a process flow diagram showing, by way of example, a method for classifying uncoded concepts for use in the method of FIG. 2.

The machine-generated suggestion for classification and associated confidence level can be determined by a classifier. FIG. 8 is a process flow diagram 130 showing, by way of example, a method for classifying uncoded concepts by a classifier for use in the method of FIG. 2. An uncoded concept is selected from a cluster within a cluster set (block 131) and compared to a neighborhood of x-reference concepts (block 132), also located within the cluster, to identify those reference concepts that are most relevant to the selected uncoded concept. In a further embodiment, a machine-generated suggestion for classification and an associated confidence level can be provided for a cluster or spine by selecting and comparing the cluster or spine to a neighborhood of x-reference concepts determined for the selected cluster or spine.

The neighborhood of x-reference concepts is determined separately for each selected uncoded concept and can include one or more reference concepts within that cluster. During neighborhood generation, an x-number of reference concepts is first determined automatically or by an individual reviewer. Next, the x-number of reference concepts nearest in distance to the selected uncoded concept are identified. Finally, the identified x-number of reference concepts are provided as the neighborhood for the selected uncoded concept. In a further embodiment, the x-number of reference concepts are defined for each classification code, rather than across all classification codes. Once generated, the x-number of reference concepts in the neighborhood and the selected uncoded concept are analyzed by the classifier to provide a machine-generated classification suggestion (block 133). A confidence level for the suggested classification is also provided (block 134).

The analysis of the selected uncoded concept and x-number of reference concepts can be based on one or more routines performed by the classifier, such as a nearest neighbor (NN) classifier. The routines for determining a suggested classification code include a minimum distance classification measure, also known as closest neighbor, minimum average distance classification measure, maximum count classification measure, and distance weighted maximum count classification measure. The minimum distance classification measure includes identifying a neighbor that is the closest distance to the selected uncoded concept and assigning the classification code of the closest neighbor as the suggested classification code for the selected uncoded concept. The closest neighbor is determined by comparing the score vectors for the selected uncoded concept with each of the x-number of reference concepts in the neighborhood as the cos σ to determine a distance metric. The distance metrics for the x-number of reference concepts are compared to identify the reference concept closest to the selected uncoded concept as the closest neighbor.

The minimum average distance classification measure includes calculating an average distance of the reference concepts in a cluster for each classification code. The classification code with the reference concepts having the closest average distance to the selected uncoded concept is assigned as the suggested classification code. The maximum count classification measure, also known as the voting classification measure, includes counting a number of reference concepts within the cluster for each classification code and assigning a count or "vote" to the reference concepts based on the assigned classification code. The classification code with the highest number of reference concepts or "votes" is assigned to the selected uncoded concept as the suggested classification. The distance weighted maximum count classification measure includes identifying a count of all reference concepts within the cluster for each classification code and determining a distance between the selected uncoded concept and each of the reference concepts. Each count assigned to the reference concepts is weighted based on the distance of the reference concept from the selected uncoded concept. The classification code with the highest count, after consideration of the weight, is assigned to the selected uncoded concept as the suggested classification.

The machine-generated classification code is provided for the selected uncoded concept with a confidence level, which can be presented as an absolute value or a percentage. Other confidence level measures are possible. The reviewer can use the suggested classification code and confidence level to assign a classification to the selected uncoded concept. Alternatively, the x-NN classifier can automatically assign the suggested classification. In one embodiment, the x-NN classifier only assigns an uncoded concept with the suggested classification code if the confidence level is above a threshold value, which can be set by the reviewer or the x-NN classifier.

Classification can also occur on a cluster or spine level. For instance, for cluster classification, a cluster is selected and a score vector for the center of the cluster is determined as described above with reference to FIG. 5. A neighborhood for the selected cluster is determined based on a distance metric. The x-number of reference concepts that are closest to the cluster center can be selected for inclusion in the neighborhood, as described above. Each reference concept in the selected cluster is associated with a score vector and the distance is determined by comparing the score vector of the cluster center with the score vector of each reference concept to determine an x-number of reference concepts that are closest to the cluster center. However, other methods for generating a neighborhood are possible. Once determined, one of the classification measures is applied to the neighborhood to determine a suggested classification code and confidence level for the selected cluster.

Figure 9:
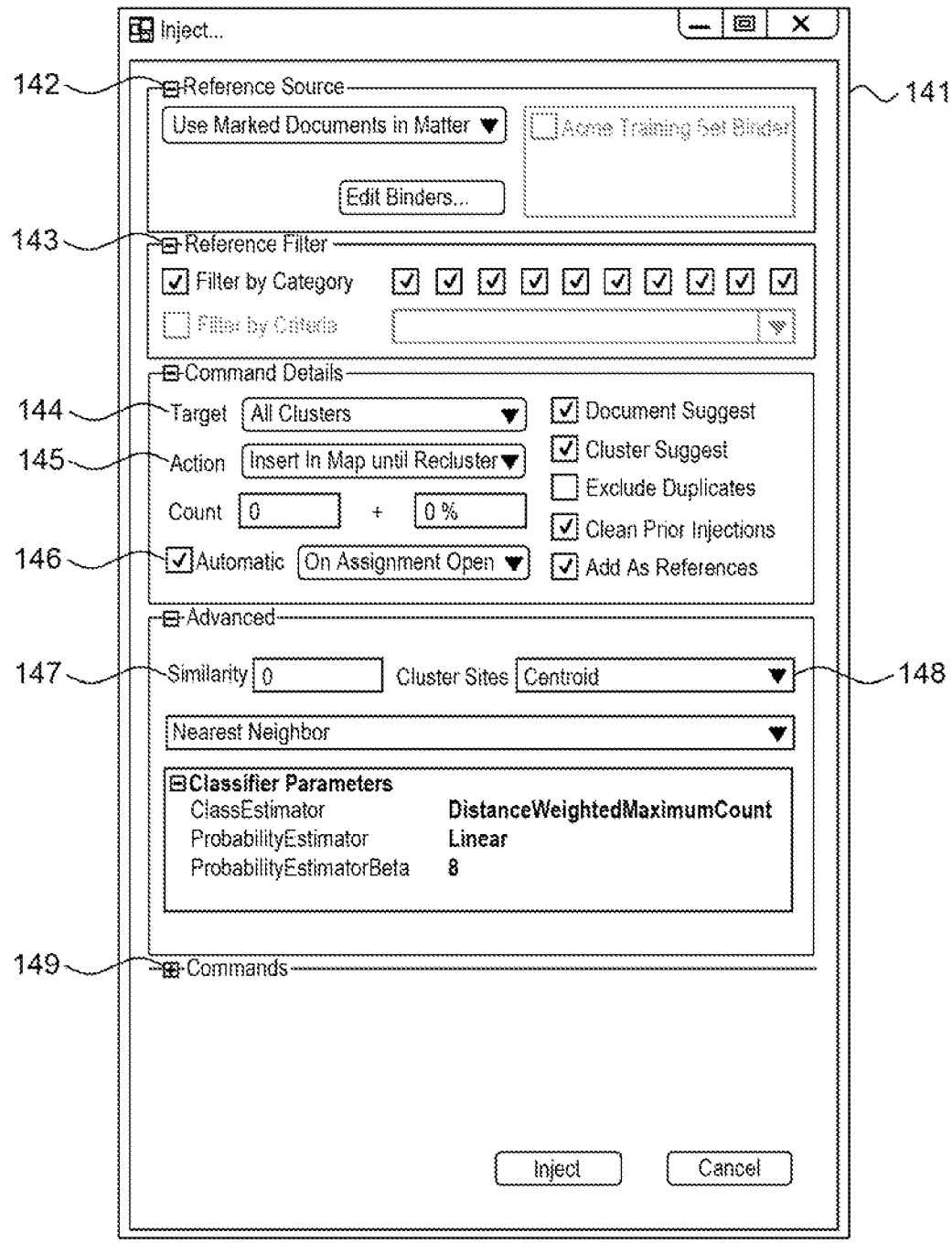
FIG. 9 is a screenshot showing, by way of example, a reference options dialogue box for entering user preferences for clustering concepts.

During classification, either by an individual reviewer or a machine, the reviewer can retain control over many aspects, such as a source of the reference concepts and a number of reference concepts to be selected. FIG. 9 is a screenshot 140 showing, by way of example, an options dialogue box 141 for entering user preferences for clustering and display of the uncoded concepts and reference concepts. The dialogue box 141 can be accessed via a pull-down menu as described above with respect to FIG. 6. Within the dialogue box 141, the reviewer can utilize user-selectable parameters to define a reference source 142, category filter 143, command details 144, advanced options 145, classifier parameters 146, and commands 147. Each user-selectable option can include a text box for entry of a user preference or a drop-down menu with predetermined options for selection by the reviewer. Other user-selectable options and displays are possible.

The reference source parameter 142 allows the reviewer to identify one or more sources of the reference concepts. The sources can include all reference concepts for which the associated classification has been verified, all reference concepts that have been analyzed, and all reference concepts in a particular binder. The binder can include reference concepts particular to a current document review project or that are related to a prior document review project. The category filter parameter 143 allows the reviewer to generate and display the subset of reference concepts using only those reference concepts associated with a particular classification code. Other options for generating the reference set are possible, including custodian, source, and content. The command parameters 144 allow the reviewer to enter instructions regarding actions for the uncoded and reference concepts, such as indicating counts of the concepts, and display of the concepts. The advanced option parameters 145 allow the reviewer to specify clustering thresholds and classifier parameters. The parameters entered by the user can be compiled as command parameters 146 and provided in a drop-down menu on a display of the clusters. Other user selectable parameters, options, and actions are possible.

In a further embodiment, once the uncoded concepts are assigned a classification code, the newly-classified uncoded concepts can be placed into the concept reference set for use in providing classification suggestions for other uncoded concepts.

In yet a further embodiment, each document can be represented by more than one concept. Accordingly, to determine a classification code for the document, the classification codes for each of the associated concepts can be analyzed and compared for consideration in classifying the document. In one example, a classification code can be determined by counting the number of associated concepts for each classification code and then assigned the classification code with the most associated concepts. In a further example, one or more of the associated concepts can be weighted and the classification code associated with the highest weight of concepts is assigned. Other methods for determining a classification code for uncoded documents based on reference concepts are possible.

Although clustering and displaying relationships has been described above with reference to concepts, other tokens, such as word-level or character-level n-grams, raw terms, and entities, are possible.

While the invention has been particularly shown and described as referenced to the embodiments thereof, those skilled in the art will understand that the foregoing and other changes in form and detail may be made therein without departing from the spirit and scope.

What is claimed is:

1. A method for displaying relationships between concepts to provide classification suggestions via inclusion, comprising the steps of:
designating reference concepts each associated with a classification code and a visual representation of that classification code comprising at least one of a shape, a color, and a symbol, wherein each concept comprises nouns and noun phrases with common semantic meaning that are extracted from a set of documents;
extracting uncoded concepts from unclassified documents and associating each of the uncoded concepts with a visual representation different from the representations of the classification codes;
forming a grouped concept set by grouping a subset of the classified reference concepts with a set of uncoded concepts;
generating clusters, each comprising a portion of the uncoded concepts and the classified reference concepts of the grouped concept set, comprising:
determining a similarity between the concepts in the grouped concept set; and
putting the concepts whose similarity exceeds a threshold into one of the clusters:
visually depicting relationships between the uncoded concepts and one or more classified reference concepts in at least one of the clusters as suggestions for classifying the uncoded concepts in that cluster, comprising displaying the visual representation associated with each of the classified reference concepts in that cluster and the visual representation of each of the uncoded concepts in that cluster,
wherein the steps are performed by a suitably programmed computer.

2. A method according to claim 1, further comprising:
determining a classification code for at least one of the uncoded concepts in the at least one cluster, comprising:
comparing the at least one uncoded concept to a neighborhood of classified reference concepts in the at least one cluster, wherein the neighborhood comprises a predetermined number of the classified reference concepts that have a closest distance to the uncoded concept; and
selecting the classification code based on the comparison of the at least one uncoded concept and classified reference concept neighborhood.

3. A method according to claim 1, further comprising:
automatically classifying the at least one uncoded concept by assigning the classification code to that uncoded concept.

4. A method according to claim 3, further comprising:
identifying the documents associated with the classified uncoded concept; and
classifying the associated documents by assigning a classification code to each of the documents.

5. A method according to claim 4, wherein the documents are identified using a matrix comprising a mapping of concepts and related documents.

6. A method according to claim 2, further comprising:
providing the classification code as a suggestion for classifying the at least one uncoded concept in the at least one cluster.

7. A method according to claim 6, further comprising:
providing a confidence level for the classification code suggestion.

8. A method according to claim 7, wherein the classification code is provided when the confidence level exceeds a predetermined threshold.

9. A method according to claim 1, further comprising:
generating the set of classified reference concepts, comprising at least one of:
identifying dissimilar uncoded concepts for a document review project and assigning a classification code to each of the dissimilar uncoded concepts for inclusion in the reference concepts set; and
clustering uncoded concepts for a document review project, selecting one or more of the uncoded concepts in one or more of the clusters, and assigning a classification code to each of the selected uncoded concepts for inclusion in the reference concepts set.

10. A method according to claim 1, wherein the subset of classified reference concepts is determined via at least one of predefined, arbitrary, or customized selection.

11. A system for displaying relationships between concepts to provide classification suggestions via inclusion, comprising:
reference concepts each associated with a classification code and a visual representation of that classification code comprising at least one of a shape, a color, and a symbol, wherein each concept comprises nouns and noun phrases with common semantic meaning that are extracted from a set of documents;
an extraction module to extract uncoded concepts from unclassified documents and to associate each of the uncoded concepts with a visual representation different from the representations of the classification codes;
a clustering module to form a grouped concept set by grouping a subset of the coded reference concepts with a set of uncoded concepts and to generate clusters, each comprising a portion of the uncoded concepts and the classified reference concepts of the grouped concept set, comprising:
a similarity module to determine a similarity between the concepts in the grouped concept set; and
a threshold module putting the concepts whose similarity exceeds a threshold into one of the clusters;
a display to visually depict relationships between the uncoded concepts and one or more classified reference concepts in at least one of the clusters as suggestions for classifying the uncoded concepts in that cluster by displaying the visual representation of the classification code of each of the classified reference concepts in that cluster and the visual representation of each of the uncoded concepts in that cluster; and
a processor to execute the modules.

12. A system according to claim 11, further comprising:
a classification module to determine a classification code for at least one of the uncoded concepts in the at least one cluster, comprising:
a comparison module to compare the at least one uncoded concept to a neighborhood of classified reference concepts in the at least one cluster, wherein the neighborhood comprises a predetermined number of the classified reference concepts that have a closest distance to the uncoded concept; and
a selection module to select the classification code based on the comparison of the at least one uncoded concept and classified reference concept neighborhood.

13. A system according to claim 11, wherein the classification module automatically classifies the at least one uncoded concept by assigning the classification code to that uncoded concept.

14. A system according to claim 13, wherein the classification module identifies the documents associated with the classified uncoded concept and classifies the associated documents by assigning a classification code to each of the documents.

15. A system according to claim 14, wherein the documents are identified using a matrix comprising a mapping of concepts and related documents.

16. A system according to claim 12, wherein the classification module provides the classification code as a suggestion for classifying the at least one uncoded concept in the at least one cluster.

17. A system according to claim 16, wherein the classification module provides a confidence level with the classification code suggestion.

18. A system according to claim 17, wherein the classification code is provided when the confidence level exceeds a predetermined threshold.

19. A system according to claim 11, further comprising:
a reference module to generate the set of classified reference concepts, comprising at least one of:
    a reference similarity module to identify dissimilar uncoded concepts for a document review project and to assign a classification code to each of the dissimilar uncoded concepts for inclusion in the reference concepts set; and
    a reference clustering module to cluster uncoded concepts for a document review project, to select one or more of the concepts in at least one cluster, and to assign a classification code to each of the selected concepts for inclusion in the reference concepts set.

20. A system according to claim 11, wherein the subset of classified reference concepts is determined via at least one of predefined, arbitrary, or customized selection.

\* \* \* \* \*